United States Patent
Shenoy et al.

(10) Patent No.: US 11,216,269 B2
(45) Date of Patent: Jan. 4, 2022

(54) SYSTEMS AND METHODS FOR UPDATE OF STORAGE RESOURCE FIRMWARE

(71) Applicant: Dell Products L.P., Round Rock, TX (US)

(72) Inventors: Ajay Shenoy, Bangalore (IN); Aniruddha Suresh Herekar, Belgaum (IN); Manjunath Vishwanath, Bangalore (IN); James Peter Giannoules, Round Rock, TX (US); Ankit Singh, Bangalor (IN); Naveen Karthick Chandrasekaran, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/738,327

(22) Filed: Jan. 9, 2020

(65) Prior Publication Data
US 2021/0216299 A1    Jul. 15, 2021

(51) Int. Cl.
*G06F 8/65* (2018.01)
*G06F 9/4401* (2018.01)

(52) U.S. Cl.
CPC .............. *G06F 8/65* (2013.01); *G06F 9/4406* (2013.01)

(58) Field of Classification Search
CPC ................................ G06F 8/65; G06F 9/4406
See application file for complete search history.

(56) References Cited

U.S. PATENT DOCUMENTS

| 9,686,078 | B1* | 6/2017 | Marr | G06F 21/00 |
| 9,934,022 | B2* | 4/2018 | Marr | G06F 8/65 |
| 2009/0094414 | A1* | 4/2009 | Hsu | G06F 8/65 |
| | | | | 711/112 |
| 2012/0272226 | A1* | 10/2012 | Yang | G06F 8/65 |
| | | | | 717/168 |

(Continued)

OTHER PUBLICATIONS

Yu et al., "A Trust Verification Architecture with Hardware Root for Secure Clouds", 2018, IEEE (Year: 2018).*

(Continued)

*Primary Examiner* — Wei Y Zhen
*Assistant Examiner* — Junchun Wu
(74) *Attorney, Agent, or Firm* — Jackson Walker L.L.P.

(57) ABSTRACT

An information handling system may include a processor, one or more storage resources communicatively coupled to the processor, including at least one of the one or more storage resources communicatively coupled to the processor via a storage interface, and a basic input/output system (BIOS) comprising a program of instructions executable by the processor and configured to cause the processor to initialize one or more information handling resources of the information handling system. The BIOS may be further configured to, in response to a request to perform a firmware update to the one or more storage resources, scan for storage resources communicatively coupled to the processor via the storage interface, register unique identifiers associated with the storage resources communicatively coupled to the processor via the storage interface, and perform a firmware update of the storage resources communicatively coupled to the processor via the storage interface based on the unique identifiers.

18 Claims, 2 Drawing Sheets

(56) References Cited

U.S. PATENT DOCUMENTS

| | | | | |
|---|---|---|---|---|
| 2014/0189674 | A1* | 7/2014 | Nagao | G06F 8/658 |
| | | | | 717/170 |
| 2014/0298309 | A1* | 10/2014 | Proschowsky | G06F 8/65 |
| | | | | 717/170 |
| 2014/0366012 | A1* | 12/2014 | Jamadagni | G06F 8/65 |
| | | | | 717/171 |
| 2015/0169316 | A1* | 6/2015 | Cavalaris | G06F 8/63 |
| | | | | 717/168 |
| 2016/0041820 | A1* | 2/2016 | Ricci | G08B 25/016 |
| | | | | 717/172 |
| 2016/0124740 | A1* | 5/2016 | Choi | G06F 8/65 |
| | | | | 717/168 |
| 2016/0202964 | A1* | 7/2016 | Butcher | G06F 8/65 |
| | | | | 717/172 |
| 2016/0306961 | A1* | 10/2016 | Suryanarayana | G06F 21/44 |
| 2017/0010899 | A1* | 1/2017 | Dasar | G06F 9/4416 |
| 2017/0147329 | A1* | 5/2017 | Shutt | G06F 8/654 |
| 2017/0220404 | A1* | 8/2017 | Polar Seminario | |
| | | | | G06F 11/0736 |
| 2018/0335981 | A1* | 11/2018 | Yoshida | G06F 3/0659 |
| 2019/0235853 | A1* | 8/2019 | Li | G06F 8/65 |
| 2020/0242662 | A1* | 7/2020 | Middleton | H04W 4/80 |

OTHER PUBLICATIONS

Regenscheid, "BIOS Protection Guidelines for Servers", Aug. 2014, NIST (Year: 2014).*
Mbakoyiannis et al., "Secure Over-the-air Firmware Updating for Automotive Electronic Control Units", 2019, ACM (Year: 2019).*
Nabi et al., "Upgrade of the IaaS Cloud", 2015, IEEE (Year: 2015).*

* cited by examiner

SYSTEMS AND METHODS FOR UPDATE OF STORAGE RESOURCE FIRMWARE

TECHNICAL FIELD

The present disclosure relates in general to information handling systems, and more particularly to updating of firmware of storage resources in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an information handling system, devices coupled to a Peripheral Component Interconnect Express (PCIe) bus, such as storage controllers, network interface cards, and storage devices on a root port of a processing complex may be detected and inventoried by the information handling system's basic input/output system (BIOS) during PCIe enumeration. BIOS may also install Firmware Management Protocol (FMP) handles for each of such devices. Firmware update of such devices may be performed by calling the SetImage( ) method of FMP. A device to be updated with new firmware may be selected by matching PCIe information passed by a user against PCI information found from the PCI input/output (I/O) protocol that queries all devices on the PCIe bus.

However, devices not on the PCIe bus such as Serial Advanced Technology Attachment (SATA) storage devices and Server-Attached Small Computer System Interface (SAS) storage devices may not be updated in the same manner, as BIOS may not install FMP handles for such devices. In addition, storage devices coupled to a processor via a storage controller may also not be able to be updated in the same manner, again as traditional BIOS may not be able to enumerate such devices. Because it may be desirable for a firmware update package to operate seamlessly to update storage devices, regardless of whether such drives are attached directly to a PCIe root port or whether such devices are coupled to a processor via a storage controller, improved systems and methods for providing firmware updates to such storage devices may be desirable.

SUMMARY

In accordance with the teachings of the present disclosure, the disadvantages and problems associated with updating firmware of storage resources may be reduced or eliminated.

In accordance with embodiments of the present disclosure, an information handling system may include a processor, one or more storage resources communicatively coupled to the processor, including at least one of the one or more storage resources communicatively coupled to the processor via a storage interface, and a basic input/output system (BIOS) comprising a program of instructions executable by the processor and configured to cause the processor to initialize one or more information handling resources of the information handling system. The BIOS may be further configured to, in response to a request to perform a firmware update to the one or more storage resources, scan for storage resources communicatively coupled to the processor via the storage interface, register unique identifiers associated with the storage resources communicatively coupled to the processor via the storage interface, and perform a firmware update of the storage resources communicatively coupled to the processor via the storage interface based on the unique identifiers.

In accordance with these and other embodiments of the present disclosure, a method may be provided for use in a system comprising a processor, one or more storage resources communicatively coupled to the processor, including at least one of the one or more storage resources communicatively coupled to the processor via a storage interface, and a basic input/output system (BIOS) comprising a program of instructions executable by the processor and configured to cause the processor to initialize one or more information handling resources of the information handling system. The method may include in response to a request to perform a firmware update to the one or more storage resources, scanning, by the BIOS, for storage resources communicatively coupled to the processor via the storage interface, registering, by the BIOS, unique identifiers associated with the storage resources communicatively coupled to the processor via the storage interface, and performing a firmware update of the storage resources communicatively coupled to the processor via the storage interface based on the unique identifiers.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in a system comprising a processor, one or more storage resources communicatively coupled to the processor, including at least one of the one or more storage resources communicatively coupled to the processor via a storage interface, and a basic input/output system (BIOS) comprising a program of instructions executable by the processor and configured to cause the processor to initialize one or more information handling resources of the information handling system: in response to a request to perform a firmware update to the one or more storage resources: (a) scan, by the BIOS, for storage resources communicatively coupled to the processor via the storage interface; (b) register, by the BIOS, unique identifiers associated with the storage resources communicatively coupled to the processor via the storage interface; and (c) perform a firmware update of the storage resources communicatively coupled to the processor via the storage interface based on the unique identifiers.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
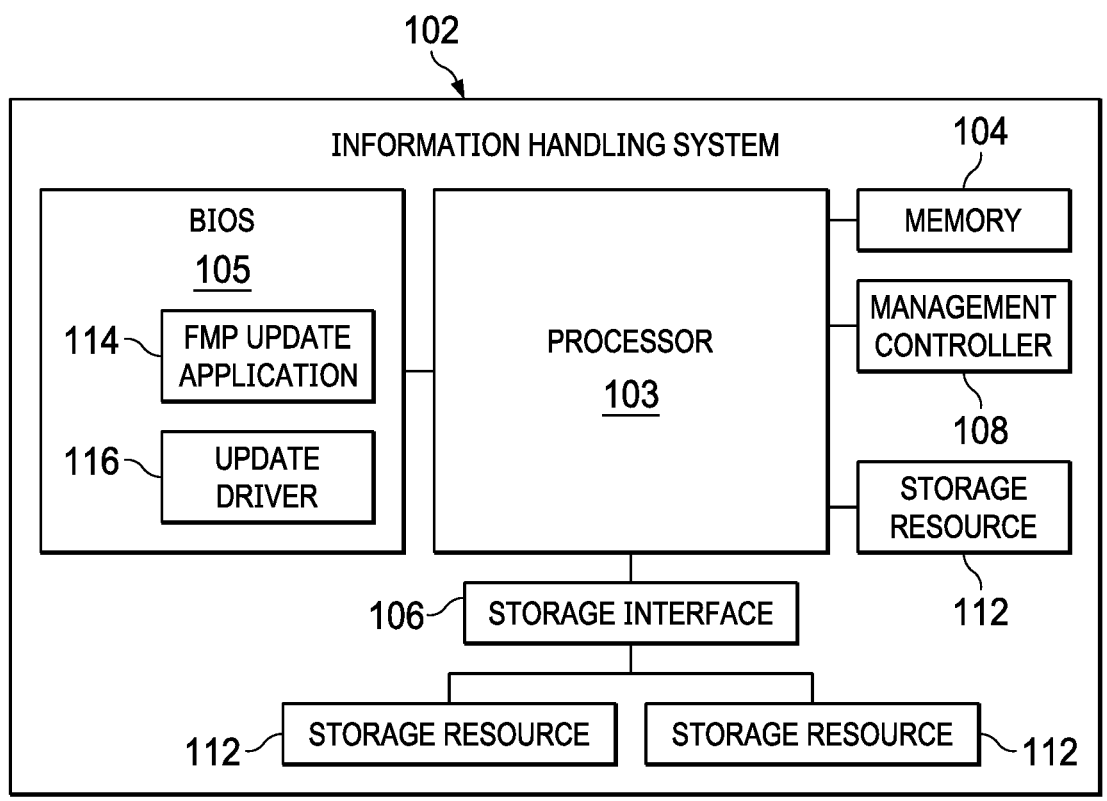
FIG. 1 illustrates a block diagram of an example information handling system, in accordance with embodiments of the present disclosure.
Figure 2:
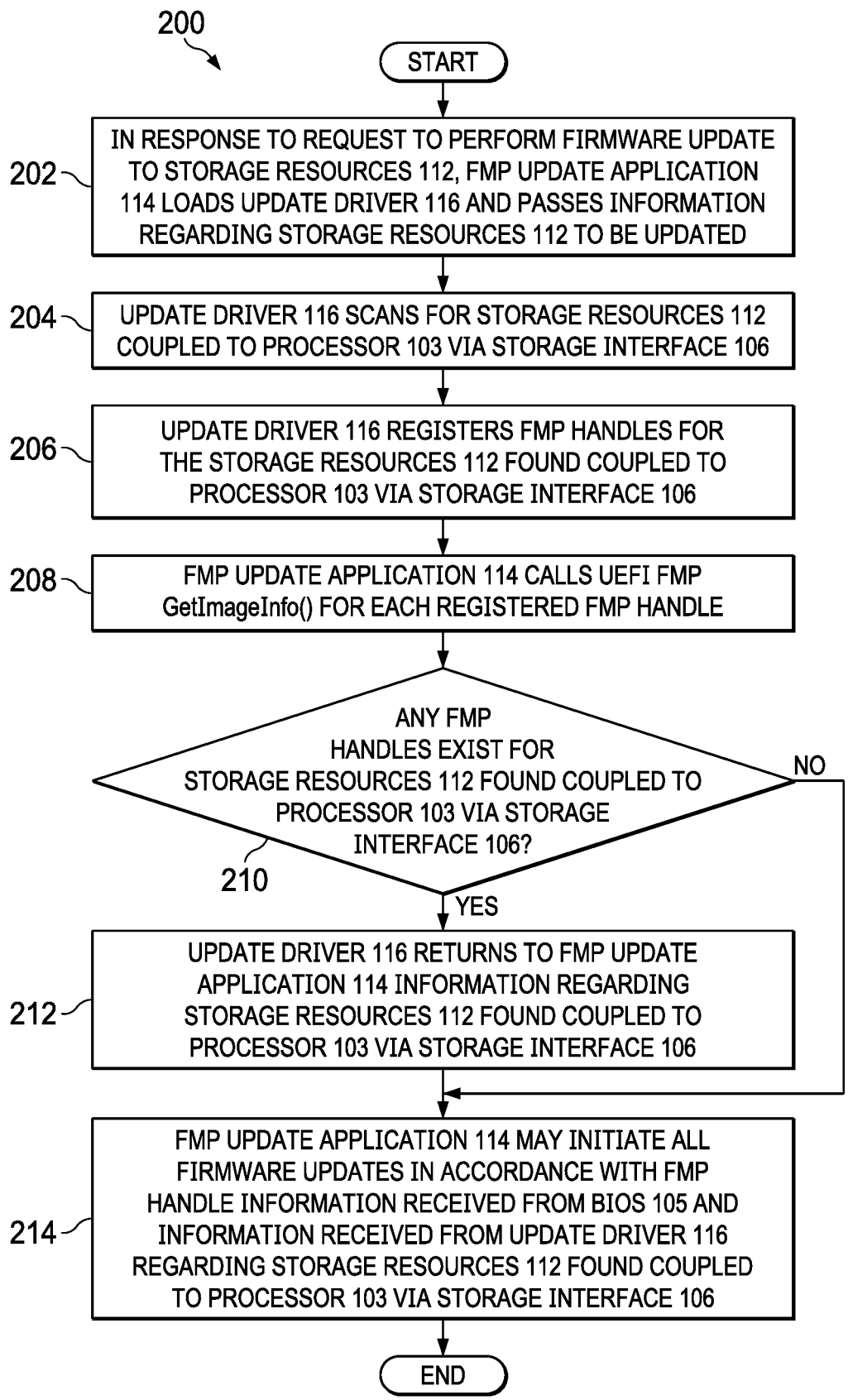
FIG. 2 illustrates a flow chart of an example method for updating firmware of storage resources, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example information handling system 102, in accordance with embodiments of the present disclosure. In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a storage interface 106 communicatively coupled to processor 103, a management controller 108 communicatively coupled to processor 103, and storage resources 112, some of which may be communicatively coupled to processor 103 via storage interface 106 and some of which may be coupled directly to processor 103 (e.g., via a PCIe bus).

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 105, storage resources 112, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 105 may implement an FMP update application 114 and an update driver 116. FMP update application 114 may comprise a program of instructions embodied in computer-readable media and configured to, when executed by processor 103, manage the updating of firmware of information handling resources of information handling system 102. Update driver 116 may comprise a program of instructions embodied in computer-readable media and configured to, when executed by processor 103, serve as an interface between FMP update application 114 and storage interface 106, to detect storage resources 112 coupled to processor 103 via storage interface 106 and enumerate such devices in order to designate FMP handles or other unique identifiers for such storage resources 112 coupled to processor 103 via storage interface 106. Thus, during a firmware update process managed by FMP update application 114, update driver 116 enables firmware update of storage resources 112 coupled to processor 103 via storage interface 106, overcoming the inability of FMP update application 114 to perform the update in absence of update driver 116 on account of the inability of BIOS 105 to enumerate such storage resources 112 coupled to processor 103 via storage interface 106.

Storage interface 106 may be communicatively coupled to processor 103 and may include any system, device, or apparatus configured to serve as an interface for communication between processor 103 and some storage resources 112 of information handling system to facilitate communication of data between processor 103 and storage resources 112 in accordance with any suitable standard or protocol. In some embodiments, storage interface 106 may provide functionality including, without limitation, disk aggregation and redundancy (e.g., RAID), I/O routing, and error detection and recovery. Storage interface 106 may also have features supporting shared storage and high availability. In some embodiments, storage interface 106 may comprise a network interface configured to interface with storage resources 112 located remotely from information handling system 102. In these and other embodiments, storage interface 106 may comprise a storage controller (e.g., a RAID controller such as PowerEdge RAID Controller (PERC) manufactured by Dell Inc.).

Management controller 108 may be configured to provide out-of-band management facilities for management of information handling system 102. Such management may be made by management controller 108 even if information handling system 102 is powered off or powered to a standby state. Management controller 108 may include any suitable components for carrying out its functionality, including without limitation a processor, memory, and an out-of-band network interface separate from and physically isolated from an in-band network interface of information handling system 102. In certain embodiments, management controller 108 may include or may be an integral part of a baseboard management controller (BMC), a remote access controller (e.g., a Dell Remote Access Controller or Integrated Dell Remote Access Controller), or an enclosure controller. In other embodiments, management controller 108 may include or may be an integral part of a chassis management controller (CMC).

Storage resources 112 may be disposed in one or more storage enclosures configured to hold and power storage resources 112. Storage resources 112 may include hard disk drives, magnetic tape libraries, optical disk drives, magneto-optical disk drives, compact disk drives, compact disk arrays, disk array controllers, Non-Volatile Memory Express (NMVe) storage resources, and/or any other system, apparatus or device operable to store media. As shown in FIG. 1, some storage resources 112 may be "directly" coupled to processor 103 (e.g., via a PCIe bus root port) without storage interface 106 intervening between, while others of storage resources 112 may be coupled to processor 103 via storage interface 106.

In addition to processor 103, memory 104, BIOS 105, storage interface 106, management controller 108, and storage resources 112, information handling system 102 may include one or more other information handling resources.

FIG. 2 illustrates a flow chart of an example method 200 for updating firmware of storage resources 112 coupled to processor 102 via storage interface 106, in accordance with embodiments of the present disclosure. According to certain embodiments, method 200 may begin at step 202. As noted above, teachings of the present disclosure may be implemented in a variety of configurations of system 100 as shown in FIG. 1. As such, the preferred initialization point for method 200 and the order of the steps comprising method 200 may depend on the implementation chosen.

At step 202, in response to a request to perform a firmware update to storage resources 112 of information handling system 102, FMP update application 114 may load update driver 116 and pass information regarding storage resources 112 to be updated. At step 204, update driver 116 may scan for storage resources 112 coupled to processor 103 via storage interface 106. At step 206, update driver 116 may register FMP handles for the storage resources 112 found coupled to processor 103 via storage interface 106. Notably, FMP handles for storage resources 112 coupled "directly" to processor 103 may be registered by BIOS 105 as part of the device enumeration process of BIOS 105.

At step 208, FMP update application 114 may call UEFI FMP GetImageInfo ( ) function for each registered FMP handle. In response, at step 210, update driver 116 may determine if any FMP handles exist for storage resources 112 found coupled to processor 103 via storage interface 106. If any such FMP handles exist, method 200 may proceed to step 212. Otherwise, method 200 may proceed to step 214.

At step 212, update driver 116 may return to FMP update application 114 information regarding storage resources 112 coupled to processor 103 via storage interface 106.

At step 214, FMP update application 114 may initiate all firmware updates in accordance with FMP handle information received from BIOS 105 and information (including FMP handles) received from update driver 116 regarding storage resources 112 found coupled to processor 103 via storage interface 106.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other suitable system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a processing complex communicatively coupled to the processor, wherein the processing complex includes a plurality of root ports;
a storage interface directly connected to one of the plurality of root ports;
a plurality of storage resources, wherein the plurality of storage resources include:
one or more root storage resources, wherein each of the one or more root storage resources is directly connected to one of the plurality of root ports; and
one or more additional storage resources, wherein each of the one or more additional storage resources is directly connected to the storage interface root and is not directly connected to any of the plurality of root ports; and
a basic input/output system (BIOS) comprising a program of instructions executable by the processor and configured to:
detect and enumerate each of the one or more root storage resources;
invoke an update driver configured to detect each of the one or more additional storage resources; and
in response to a request to perform a firmware update for the plurality of storage resources:
scan for the one or more additional storage resources;
register unique identifiers for each of the one or more additional storage resources; and update firmware for the one or more root storage resources and the one or more additional storage resources, wherein updating the firmware update for the additional storage resources comprises updating the firmware for the one or more additional storage resources based on the unique identifiers.

2. The information handling system of claim 1, wherein the plurality of storage resources comprise one or more Non-Volatile Memory Express storage devices.

3. The information handling system of claim 1, wherein the storage interface is a storage controller.

4. The information handling system of claim 1, wherein the BIOS is further configured to enumerate and register unique identifiers for each of the one or more root storage interface interfaced between resources.

5. The information handling system of claim 4, wherein each of the one or more root storage resources is coupled to the processor via a Peripheral Component Interconnect Express bus.

6. The information handling system of claim 1, wherein the unique identifier comprises a Firmware Management Protocol handle.

7. A firmware update method for an information handling system comprising a processor, a processing complex communicatively coupled to the processor, wherein the processing complex includes a plurality of root ports, a storage interface directly connected to one of the plurality of root ports, and a plurality of storage resources, wherein the plurality of storage resources include one or more root storage resources, wherein each of the one or more root storage resources is directly connected to one of the plurality of root ports, and one or more additional storage resources, wherein each of the one or more additional storage resources is directly connected to the storage interface root and is not directly connected to any of the plurality of root ports, wherein the firmware update method comprises:
    detecting and enumerating each of the one or more root storage resources;
    invoking an update driver configured to detect each of the one or more additional storage resources; and
    in response to a request to perform a firmware update for the plurality of storage resources:
    scanning for the one or more additional storage resources;
    registering unique identifiers
    for each of the one or more additional storage resources; and
    updating firmware for the one or more root storage resources and the one or more additional storage resources, wherein updating firmware for the additional storage resources comprises updating firmware for the one or more additional storage resources based on the unique identifiers.

8. The method of claim 7, wherein the plurality of storage resources comprise one or more Non-Volatile Memory Express storage devices.

9. The method of claim 7, wherein the storage interface is a storage controller.

10. The method of claim 7, further comprising:
    enumerating and registering unique identifiers for each of the one or more root storage resource.

11. The method of claim 10, wherein each of the one or more root storage resources is coupled to the processor via a Peripheral Component Interconnect Express bus.

12. The method of claim 7, wherein the unique identifier comprises a Firmware Management Protocol handle.

13. An article of manufacture comprising:
    a non-transitory computer readable medium; and
    computer-executable instructions carried on the computer readable medium, the instructions readable by a processor of an information handling system comprising a processing complex communicatively coupled to the processor, wherein the processing complex includes a plurality of root ports, a storage interface directly connected to one of the plurality of root ports, and a plurality of storage resources, wherein the plurality of storage resources include one or more root storage resources, wherein each of the one or more root storage resources is directly connected to one of the plurality of root ports, and one or more additional storage resources, wherein each of the one or more additional storage resources is directly connected to the storage interface root and is not directly connected to any of the plurality of root ports, wherein the instructions, when read and executed, for causing the processor to perform firmware update operations comprising:
    detecting and enumerating each of the one or more root storage resources;
    invoking an update driver configured to detect each of the one or more additional storage resources; and
    in response to a request to perform a firmware update for the plurality of storage resources:
    scanning for the one or more additional storage resources;
    registering unique identifiers
    for each of the one or more additional storage resources; and
    updating firmware for the one or more root storage resources and the one or more additional storage resources, wherein updating firmware for the additional storage resources comprises updating firmware for the one or more additional storage resources based on the unique identifiers.

14. The article of claim 13, wherein the plurality of storage resources comprise one or more Non-Volatile Memory Express storage devices.

15. The article of claim 13, wherein the storage interface is a storage controller.

16. The article of claim 13, wherein the firmware update operations include:
    enumerating and registering unique identifiers for each of the one or more root storage resources.

17. The article of claim 16, wherein each of the one or more root storage resources is coupled to the processor via a Peripheral Component Interconnect Express bus.

18. The article of claim 13, wherein the unique identifier comprises a Firmware Management Protocol handle.

\* \* \* \* \*